US010116368B2

(12) United States Patent
O'Keeffe et al.

(10) Patent No.: US 10,116,368 B2
(45) Date of Patent: Oct. 30, 2018

(54) COMMUNICATION UNIT, INTEGRATED CIRCUIT AND METHOD FOR GENERATING A PLURALITY OF SECTORED BEAMS

(71) Applicant: Analog Devices Global, Hamilton (BM)

(72) Inventors: Conor O'Keeffe, Passage West (IE); Michael O'Brien, Youghal (IE); Sean Sexton, Cork (IE)

(73) Assignee: Analog Devices Global, Hamilton (BM)

( * ) Notice: Subject to any disclaimer, the term of this patent is extended or adjusted under 35 U.S.C. 154(b) by 173 days.

(21) Appl. No.: 14/912,057

(22) PCT Filed: Aug. 15, 2014

(86) PCT No.: PCT/EP2014/067480
§ 371 (c)(1),
(2) Date: Feb. 12, 2016

(87) PCT Pub. No.: WO2015/022421
PCT Pub. Date: Feb. 19, 2015

(65) Prior Publication Data
US 2016/0197660 A1 Jul. 7, 2016

(30) Foreign Application Priority Data
Aug. 16, 2013 (GB) .................................. 1314729.3

(51) Int. Cl.
*H01Q 1/24* (2006.01)
*H01Q 3/26* (2006.01)
(Continued)

(52) U.S. Cl.
CPC ........... *H04B 7/0617* (2013.01); *H01Q 1/246* (2013.01); *H01Q 3/267* (2013.01); *H04B 7/0408* (2013.01);
(Continued)

(58) Field of Classification Search
CPC .. H04B 7/0408; H04B 7/0491; H04B 7/0617; H04B 17/11; H04B 17/12; H04B 17/14; H04W 16/28; H01Q 3/267; H01Q 1/246
See application file for complete search history.

(56) References Cited

U.S. PATENT DOCUMENTS

| 4,532,518 A | 7/1985 | Gaglione et al. |
| 6,133,868 A | 10/2000 | Butler et al. |

(Continued)

FOREIGN PATENT DOCUMENTS

| CN | 1324504 | 11/2001 |
| CN | 1326321 | 7/2007 |

(Continued)

OTHER PUBLICATIONS

Examination Report dated Jul. 24, 2017 for Patent Application No. GB1314729.3, 4 pages.

(Continued)

*Primary Examiner* — Asad M Nawaz
*Assistant Examiner* — Kai Chang
(74) *Attorney, Agent, or Firm* — Knobbe, Martens, Olson & Bear, LLP (57) ABSTRACT

A communication unit comprises a plurality of antenna element feeds (203, 205) for coupling to a plurality of antenna elements of an antenna array, where each antenna element feed comprises at least one coupler; and a plurality of transmitters operably coupled to the plurality of antenna element feeds. At least one transmitter of the plurality of transmitters comprises: an input for receiving a first signal and at least one second signal; beamformer logic arranged to apply independent beamform weights (RefBF1, RefBF2) on the first signal and the at least one second signal of the transmitter respectively, wherein each of the independent beamform weights is allocated on a per sector basis; and a (Continued)

signal combiner arranged to combine the first signal and the second signal to produce a combined signal, such as that the combined signal supports a plurality of sectored beams.

20 Claims, 5 Drawing Sheets

(51) Int. Cl.
| | | |
|---|---|---|
| *H04B 7/04* | (2017.01) | |
| *H04B 7/06* | (2006.01) | |
| *H04B 17/11* | (2015.01) | |
| *H04B 17/12* | (2015.01) | |
| *H04B 17/14* | (2015.01) | |
| *H04W 16/28* | (2009.01) | |
| *H04B 7/0408* | (2017.01) | |
| *H04B 7/0491* | (2017.01) | |

(52) U.S. Cl.
CPC ........... *H04B 7/0491* (2013.01); *H04B 17/11* (2015.01); *H04B 17/12* (2015.01); *H04B 17/14* (2015.01); *H04W 16/28* (2013.01)

(56) References Cited

U.S. PATENT DOCUMENTS

| | | | | |
|---|---|---|---|---|
| 6,272,335 | B1* | 8/2001 | Nakayama | H04B 7/0491 455/422.1 |
| 6,693,588 | B1* | 2/2004 | Schlee | H01Q 3/267 342/165 |
| 6,735,182 | B1* | 5/2004 | Nishimori | H01Q 3/26 342/372 |
| 6,778,507 | B1* | 8/2004 | Jalali | H04B 7/0632 370/317 |
| 7,706,323 | B2 | 4/2010 | Stopler et al. | |
| 8,934,457 | B2* | 1/2015 | Kapoor | H01Q 1/246 370/334 |
| RE45,775 | E* | 10/2015 | Agee | H04W 52/265 |
| 9,270,360 | B2* | 2/2016 | Eom | H01Q 21/24 |
| 2001/0038356 | A1 | 11/2001 | Frank | |
| 2003/0096638 | A1* | 5/2003 | Doi | H01Q 3/2605 455/562.1 |
| 2003/0228887 | A1* | 12/2003 | Kishigami | H04B 1/7113 455/561 |
| 2004/0106412 | A1* | 6/2004 | Laroia | H04W 16/12 455/448 |
| 2004/0185783 | A1* | 9/2004 | Okawa | H04B 7/0491 455/63.4 |
| 2004/0246048 | A1 | 12/2004 | Leyonhjelm et al. | |
| 2005/0192058 | A1* | 9/2005 | Jung | H04W 16/28 455/562.1 |
| 2005/0239419 | A1 | 10/2005 | Fudaba et al. | |
| 2006/0009162 | A1* | 1/2006 | Tan | H01Q 3/267 455/67.11 |
| 2006/0079290 | A1* | 4/2006 | Seto | H01Q 3/2605 455/562.1 |
| 2006/0111050 | A1* | 5/2006 | Choi | H01Q 3/267 455/67.11 |
| 2006/0234694 | A1* | 10/2006 | Kawasaki | H01Q 3/267 455/423 |
| 2007/0171962 | A1 | 7/2007 | Bolourchi et al. | |
| 2007/0183545 | A1* | 8/2007 | Yuda | H04B 7/0619 375/347 |
| 2007/0207730 | A1* | 9/2007 | Nguyen | H01Q 1/246 455/39 |
| 2007/0285312 | A1* | 12/2007 | Gao | H01Q 1/246 342/367 |
| 2008/0298445 | A1* | 12/2008 | Richardson | H04B 7/0491 375/224 |
| 2009/0322608 | A1 | 12/2009 | Adams et al. | |
| 2009/0323847 | A1* | 12/2009 | Na | H04B 7/0413 375/267 |
| 2010/0119002 | A1* | 5/2010 | Hartenstein | H01Q 21/205 375/267 |
| 2010/0141530 | A1* | 6/2010 | McMahon | H01Q 1/246 342/417 |
| 2010/0164802 | A1 | 7/2010 | Li et al. | |
| 2010/0166110 | A1 | 7/2010 | Neumann et al. | |
| 2011/0032972 | A1* | 2/2011 | Wang | H04B 1/7075 375/130 |
| 2011/0103504 | A1 | 5/2011 | Ma | |
| 2011/0134972 | A1 | 6/2011 | Zhu et al. | |
| 2011/0150050 | A1* | 6/2011 | Trigui | H04B 7/0617 375/219 |
| 2011/0235734 | A1* | 9/2011 | Kenington | H04B 7/0623 375/267 |
| 2011/0243285 | A1 | 10/2011 | Kenington | |
| 2012/0020392 | A1 | 1/2012 | O'Keeffe et al. | |
| 2012/0044917 | A1* | 2/2012 | O'Keeffe | H04B 7/0408 370/338 |
| 2012/0093209 | A1* | 4/2012 | Schmidt | H04L 27/2624 375/224 |
| 2012/0099469 | A1 | 4/2012 | Luo et al. | |
| 2012/0172096 | A1 | 7/2012 | Samardzija et al. | |
| 2012/0281777 | A1 | 11/2012 | Ho et al. | |
| 2012/0287978 | A1 | 11/2012 | O'Keeffe et al. | |
| 2012/0287981 | A1 | 11/2012 | Xiao et al. | |
| 2013/0034010 | A1 | 2/2013 | Gao et al. | |
| 2013/0077708 | A1* | 3/2013 | Sorrells | H04B 1/04 375/295 |
| 2013/0128764 | A1* | 5/2013 | Lee | H04B 7/0695 370/252 |
| 2013/0308717 | A1* | 11/2013 | Maltsev | H04B 7/0417 375/267 |
| 2013/0329820 | A1* | 12/2013 | Harel | H04B 7/0456 375/267 |
| 2014/0086205 | A1* | 3/2014 | Nakasato | H04L 5/0037 370/330 |
| 2014/0099907 | A1* | 4/2014 | Chiron | H03F 3/195 455/115.2 |
| 2014/0211731 | A1 | 7/2014 | Inoue et al. | |
| 2015/0103952 | A1* | 4/2015 | Wang | H04L 27/368 375/297 |
| 2015/0288438 | A1* | 10/2015 | Maltsev | H01Q 3/40 455/101 |

FOREIGN PATENT DOCUMENTS

| | | |
|---|---|---|
| CN | 101359948 | 2/2009 |
| EP | 1615291 | 12/2006 |
| GB | 2467772 | 8/2010 |
| GB | 2467773 | 8/2010 |
| GB | 2471669 | 1/2011 |
| GB | 2476252 | 6/2011 |
| WO | WO 2013-024852 | 2/2013 |

OTHER PUBLICATIONS

Examination Report dated Aug. 18, 2016 for Patent Application No. GB1314729.3, 3 pages.
United Kingdom Search and Examination Report dated Feb. 10, 2014 for Patent Application No. GB1314729.3.
Written Opinion dated Nov. 28, 2014 for International Patent Application PCT/EP2014/067480 filed on Aug. 15, 2014. 4 pages.
International Search Report dated Nov. 28, 2014 for International Patent Application PCT/EP2014/067480 filed on Aug. 15, 2014. 3 pages.
Lee, et al., "A Digital Adaptive Beamforming QAM Demodulator IC for High Bit-Rate Wireless Communications", IEEE Journal of Solid-State Circuits, IEEE Service Center, Piscataway, NJ, USA, vol. 33, No. 3, Mar. 1, 1998, pp. 367-376.
Tsakalaki, E., et al., "Deterministic beamforming for enhanced vertical sectorization and array pattern compensation," 6th European Conference on Antennas and propagation (EUCAP), 2012, pp. 2789-2793.

* cited by examiner

COMMUNICATION UNIT, INTEGRATED CIRCUIT AND METHOD FOR GENERATING A PLURALITY OF SECTORED BEAMS

FIELD OF THE INVENTION

The field of the invention relates to an antenna arrangement and method for generating a plurality of sectored beams, for example on a single antenna array.

BACKGROUND OF THE INVENTION

In traditional passive antenna systems, only one sector can be supported on an antenna at a single carrier frequency. The beam shape of all sectors from the passive antenna is typically fixed by a combination of the antenna element structure and the corporate feed network that applies the signal to the individual antenna element feeds. In order to combat the disadvantages of passive antenna systems, active antenna array systems (AAS) have been developed. An AAS is generally created by integrating several radio frequency (RF) components (e.g. power amplifiers, transceivers, couplers, etc.), which are conventionally considered as part of a base station, with the antenna's radiating elements. This enables the phase and amplitude of the signals from each radiating element inside the antenna to be electronically controlled, using signal processing to shape and steer the direction of the radiated beam. The direction can be controlled in both a vertical and horizontal azimuth, and this technique is more generally referred to as beamforming.

Vertical beamforming can be used to create a plurality of beams with at least one beam dedicated per cell sector, and where the beams are directed to different geographic regions away from the antenna. In creating two dedicated cell sectors with a passive antenna arrangement, sector area hardware resources may be doubled. Currently, the known ways of providing different 'tilts' of the antenna beams using conventional passive antennae other than utilise separate antenna arrays. An alternate means is to partition an antenna array to create a subgroup of antenna elements to act on a separate sector, where each subgroup would process beams dedicated to an individual cell sector.

These two techniques to provide different tilts have a number of disadvantages associated with them. For example, in the case of utilising separate antenna arrays to act on different sectors, a duplication of antenna units will need to be deployed to provide the same performance. This results in increased costs in terms of installation time, antenna tower real estate requirements and coaxial feeder cable to separate radio units as part of the infrastructure deployment.

Further, in the case of the antenna array being sub-partitioned, the effective beam width that can be produced by the array is increased, thereby increasing an overlap region between adjacent sectors. A yet further disadvantage is that, as the array becomes divided between sectors, there is a proportionate reduction in available antenna gain.

In Antennas and Propagation (EUCAP), 2012 6th European Conference, Page(s): 2789-2793, a use of an array for outputting vertical sectorisation beams is discussed. This document does not consider embodiments of beam signal processing synthesis or of how a calibration scheme for an antenna array supporting such vertical sectorisation beams could be supported.

SUMMARY OF THE INVENTION

Accordingly, the invention seeks to mitigate, alleviate or eliminate one or more of the above mentioned disadvantages, either singly or in any combination.

According to a first aspect, a communication unit comprises: a plurality of antenna element feeds for coupling to a plurality of antenna elements of an antenna array, where each antenna element feed comprises at least one coupler; a plurality of transmitters operably coupled to the plurality of antenna element feeds. At least one transmitter of the plurality of transmitters comprises: at least one input for receiving a first signal and at least one second signal; beamformer logic arranged to apply independent beamform weights on the first signal and the at least one second signal of the transmitter respectively, wherein each of the independent beamform weights is allocated on a per sector basis; and a signal combiner arranged to combine the first signal and the second signal to produce a combined signal, such that the combined signal supports a plurality of sectored beams.

According to an optional example, the communication unit may further comprise a signal processor operably coupled to beamformer logic and arranged to concurrently process a transmission of a plurality of sector beams applied to at least one antenna element feed of the plurality of antenna elements.

According to an optional example, the beamformer logic may be arranged to apply independent beamform weights on signals transmitted on the same carrier frequency or in overlapping occupied spectrum.

According to an optional example, a single antenna array of an active antenna system may be configured to support multiple sectors on at least one carrier frequency. In one example, the single antenna array of the active antenna system is configured to support multiple sectors on a single carrier frequency using at least one common antenna element.

According to an optional example, the communication unit may further comprise a frequency converter operably coupled to the signal combiner and arranged to frequency-convert the combined signal and route the frequency-converted combined signal to a plurality of the antenna elements to support a plurality of sectored beams.

According to an optional example, Crest Factor Reduction (CFR) signal processing block may be arranged to apply crest factor reduction to the combined signal.

According to an optional example, the independent beamform weights may comprise at least one calibration correction coefficient that is normalised for the at least one transmitter against a reference transmitter. In one example, the normalised at least one calibration correction coefficient in respect of the first transceiver may comprise normalising the at least one calibration correction coefficient in respect of a transceiver that is determined as having the longest latency. In this example, the communication unit may further comprise a complex multiplier arranged to apply the independent beamform weights and at least one calibration correction factor.

According to an optional example, beamformer logic may be arranged to apply independent beamform weights on the first signal and the second signal of the transmitter to provide beam sectorisation in at least one of: a vertical plane, a horizontal plane. In this example, beam sectorisation for at least two beams may comprise a first sectored beam at a first power and a second sectored beam at a different second power. In this example, beam sectorisation for at least two beams may comprise a first sectored beam at a first beamwidth and a second sectored beam at a different second beamwidth. In this example, beam sectorisation for at least two beams may comprise weights to provide a first sectored beam at a first direction and a second sectored beam at a different second direction.

According to a second aspect, an integrated circuit for at least one transceiver of a communication unit is described. The integrated circuit comprises: at least one input for receiving a first signal and at least one second signal; beamformer logic arranged to apply independent beamform weights on the first signal and the at least one second signal of the transmitter respectively, wherein each of the independent beamform weights is allocated on a per sector basis; and a signal combiner arranged to combine the first signal and the second signal to produce a combined signal, such that the combined signal supports a plurality of sectored beams.

According to a third aspect, a method for generating a plurality of sectored beams in an antenna array that comprises a plurality of antenna element feeds for coupling a plurality of respective transmitters to a plurality of antenna elements via respective coupler ports is describe. The method comprises, at a communication unit: applying a first signal and at least one second signal to a first transmitter of the plurality of transmitters; applying independent beamform weights on the first signal and the at least one second signal of the transmitter, wherein each of the independent beamform weights is allocated on a per sector basis; and combining the first signal and the at least one second signal to produce a combined signal, such that the combined signal supports a plurality of sectored beams.

According to a fourth aspect of the invention, a computer program product comprises program code generating a plurality of sectored beams in an antenna array, the computer program product comprising program code operable for, when executed at a communication unit, performing the method of the third aspect of the invention.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Example embodiments of the invention are described with reference to smart (or active) antenna technology used in a wireless communication system. Example embodiments of the invention describe a means of calibrating and utilising an entirety of an active antenna array system (AAS), to support multi-sector operation, thereby supporting different beams using the same antenna elements. In this manner, a mechanism is described that effectively provides multi sector support on a single antenna array. Further, in some examples, it may be advantageous to provide multi sector support utilising the same carrier frequency or overlapping occupied spectrum and utilising common antenna elements of the antenna array.

The following description focuses on embodiments of the invention that are applicable to active antenna arrays employed in Long Term Evolution (LTE) cellular communication systems including a Frequency Division Duplex (FDD) based LTE network and evolutions to this standard such as LTE-A as standardised by the $3^{rd}$ generation partnership project (3GPP™). Example embodiments of the invention are also applicable to Time Division Duplex (TDD) variants of LTE such as TD-LTE. However, it will be appreciated that the invention is not limited to this particular cellular communication system, but may be applied to any wireless communication system, including legacy wireless systems such as 3G UMTS and HSPA that employ an antenna array arrangement where a plurality of antenna elements are used.

For the purposes of clarity, a definition of the expression 'occupied bandwidth' has been provided by 3GPP TS 34.121. Here, Occupied Bandwidth (OBW) is the bandwidth containing 99% of the total integrated power of the transmitted spectrum, centred on the assigned channel frequency (as assigned to a single sector). The occupied spectrum then, by definition, is the assigned channel frequency minus half the occupied bandwidth to the assigned channel frequency plus half the occupied bandwidth.

Where sectors have 'overlapping occupied spectrum', this expression is herein defined as encompassing any of the frequencies within the occupied spectrum of one sector that are common with any of frequencies within the occupied bandwidth of a second sector.

A sector of a cellular network for the purposes of the example embodiments described herein is a three dimensional space (defined by an antenna beam and the propagation environment), whereby user equipment (UE) can relay messages to and from a base station using an assigned channel frequency or channel frequencies.

Adjacent sectors within a local geographical region often may include further unique attributes to allow UE devices to distinguish them apart, and or limit interference, these attributes being, for example; a cell or sector ID (identifier) broadcast as part of an embedded modulated logic channel, a scrambling code, carrier frequency, air interface protocol or channel occupied bandwidth.

Figure 1:
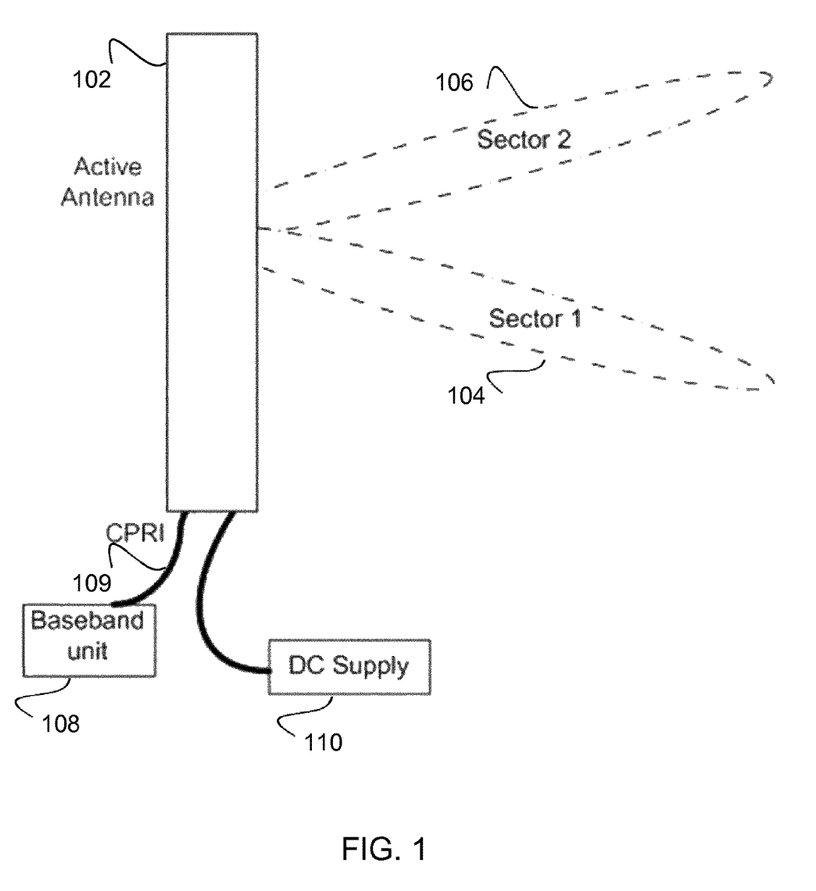
FIG. 1 illustrates an example of an active antenna system as deployed in a network generating two sectors.

Referring to FIG. 1, an example of an active antenna system 102 generating two sectors is illustrated in accordance with some embodiments of the invention. In this example embodiment, the active antenna system 102 is capable of forming a plurality of beam shapes 104, 106 in the downlink, transmit, path. Only two beam shapes supporting two sectors are being shown for illustrative purposes only. In other examples, corresponding receive beams may also be generated in the receive uplink path.

An active antenna system 102 further comprises being operably connected to a baseband unit/module 108 through at least one optical interface 109. In this example, the at least one optical interface 109 is a common public radio interface (CPRI). In other examples, the at least one optical interface may be an OBSAI RP3-01 interface, or an open radio equipment interface (ORI). In this example, the CPRI interface 109 may be operable to allow IQ data samples to be transferred to and from baseband unit/module 108, which may reside in a remote physical location to the AAS 102. In this example, baseband module 108 comprises demodulation call processing functionality and core network backhaul functionality. In some examples, the baseband unit/module 108 may also contain RNC (Radio Network Control) functionality, for example, for LTE systems. In other examples, the baseband unit/module 108 may be incorporated within the AAS 102. The AAS 102 is further operably coupled to a DC (Direct Current) supply module 110 that is operable to power the AAS 102.

In this example, AAS 102 may be operable to emit and receive different beam shapes 104, 106 for different sectors, utilising common radiating elements. Example embodiments of the invention, described with reference to later figures, provide a means of calibrating and utilising up to an entirety of antenna elements on an AAS 102 to support different beams using the same antenna elements. In this manner, a mechanism is described that effectively provides multi sector support on, say, a single antenna array. Further, in some examples, it may be advantageous to provide multi sector support utilising the same carrier frequency or overlapping occupied spectrum and support the same air interface standard and utilising common antenna elements of the antenna array.

In this manner, AAS 102 may be calibrated to provide outputs with different tilts (vertical) and or pans (horizontal) utilising common radiating elements. In some examples, it may be advantageous to emit and receive beams at different tilts and pans so that interference from one sector, 104, does not substantially degrade that of the other, for example 106.

Although the example embodiments are illustrated with respect to providing the same or similar beamwidths per sector, it is envisaged that in other examples the concepts herein described may also be applied to support different beamwidths per sector, for example when the AAS is supporting, say, both macro and small cell applications. In small cell applications it may be desirable to have a wider vertical beamwidth as the cell sector supported is more local to the AAS. In this regard it may be advantageous to use a subset of the entirety of available antenna elements of the array to generate, such cell sector beams.

When vertical sectorisation is considered in a macrocell basestation, depending on the height of the antenna installation over surrounding ground level, a beam that skirts the earth's horizon is normally at between 2° and 4° downtilt. Thus, beams placed close to the antenna array through the vertical sectorisation technique will be covering a smaller geographic area and will be closer to the antenna installation. Typical sector beams pointing angles for vertical sectorisation could be, for example, at 2° for sector one and 10° downtilt for sector two. Mobile operators manage the downlink (DL) power in the beam(s) of the cell sector to maintain a certain link budget of received signal CINR (Carrier to interference plus noise ratio) to user equipment (UE) devices serviced by the cell sector. Therefore, UE devices closer to the antenna will require less downlink (DL) transmitted power from the AAS to maintain a given CINR compared to those located further away. Given this, power transmitted per sector beam(s) may be different to maintain a particular sector serviced UE to receive a minimum given CINR on, for example, at 2° downtilt for sector one and 10° downtilt for sector two sector beams. Embodiments of the invention could, for example, have the signal scaled on a per sector basis to manage the link CINR budget to serviced UE devices. In some examples, this may be done by means of a dedicated scalar (e.g. a magnitude multiplier) of the per sector signals on the downlink or by means of scaling the beam weights applied to said signals.

Although the example embodiments are illustrated with respect to providing beam sectorisation in the vertical plane, it is envisaged that in other examples, the concepts herein described may also be applied to a horizontal plane or both vertical and horizontal planes concurrently. The example embodiments given by way of example herein allow for vertical sectorisation; however it will be apparent that the techniques employed also apply to horizontal sectorisation if the antenna array in question is configured in such a manner, for example by means of including columns in the array or by means of installing the AAS 102 horizontal to the vertical plane.

Figure 2:
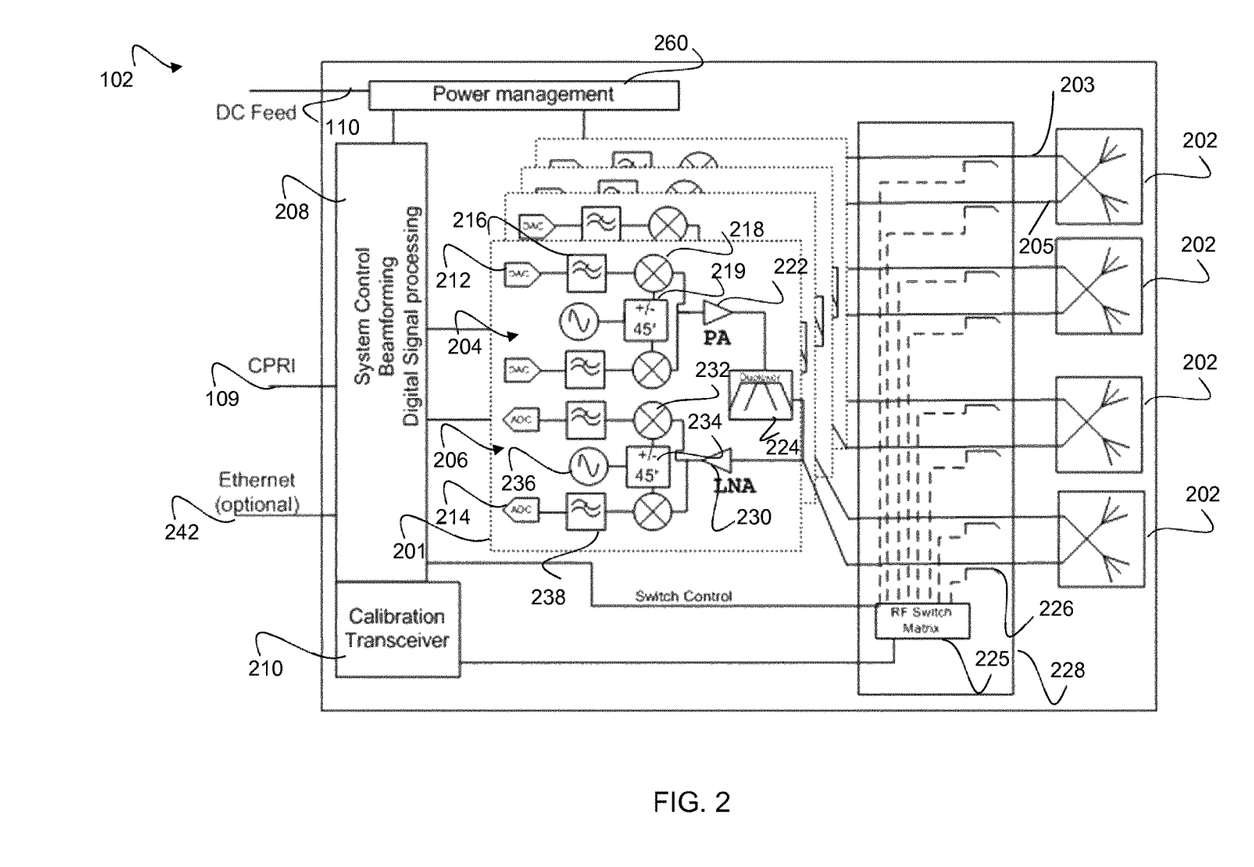
FIG. 2 illustrates an example of an active antenna array system (AAS) architecture.

Referring now to FIG. 2, an example of an active antenna array system (AAS) 102 adapted to support example embodiments of the invention is illustrated. The example AAS 102 comprises a CPRI interface 109 for interfacing to a baseband processing unit of a cellular base station, such as a third generation partnership project (3GPP™) evolved Node B (eNodeB). The cellular base station comprises base band circuits that perform demodulation decoding in the receive path and modulation and encoding in the transmit path. Multiple-in/multiple-out (MIMO) data for example is transferred between the base station and the AAS 102 in LTE mode operation. The AAS 102 comprises one or more of its own baseband processing circuits 208, which are arranged to perform functions including but not limited to for example system control, beamform manipulation and additional signal processing. Example embodiments of the invention utilise a plurality of parallel transceiver paths, often equivalent to a number of antenna elements used. In one example embodiment, a further transceiver path may be included to provide a dedicated common calibration transceiver path 210.

The AAS 102, which in one example may contain an RF transmit subsystem of a communication network element or broadcast transmitter, comprises a plurality of parallel transceiver circuits 201 operably coupled via a switch coupler structure 228 to an antenna arrangement 202 comprising, in this example, an array of cross-polarised antenna elements. The transmit module 204 and receive module 206 within the transceiver 201 are also operably connected to the antenna arrangement 202, as shown.

In this example, the antenna arrangement 202 comprises an antenna array having a plurality of cross polarised (XPOL) antenna elements employing, for example both +45° and −45° orthogonal antenna elements, with an independent transmit module 204 and receive module 206 connected to each antenna port. In some examples grouped elements could be ganged and fed with a common feed to all elements. Each element radiates a proportion of the total beam power processed by the AAS. Beamforming works on the basis that signals that are 'combined in the air' add substantially coherently in the direction of the main lobe of the beam. Therefore, the signal(s) processed by any one element or ganged group of elements only forms a portion of the total signal power processed in the radiated beam from the AAS.

In some examples, it is envisaged that multiple synthesised polarisations may be applied, for example in a transmit (DL) embodiment, using a plurality of antenna elements. The teachings contained in the inventors co-pending UK Patent Application No: GB0921956.9 surrounding the use of synthesised polarisation on transmitted signals may also be adapted in the example embodiments described herein. In this teaching the polarisation of the radiated signal can be manipulated by controlling the amplitude and phase of said signal applied to the feeds 203, 205 of a cross polarised antenna element of the antenna arrangement 202, and this feature is therefore incorporated herein by reference.

Figure 3:
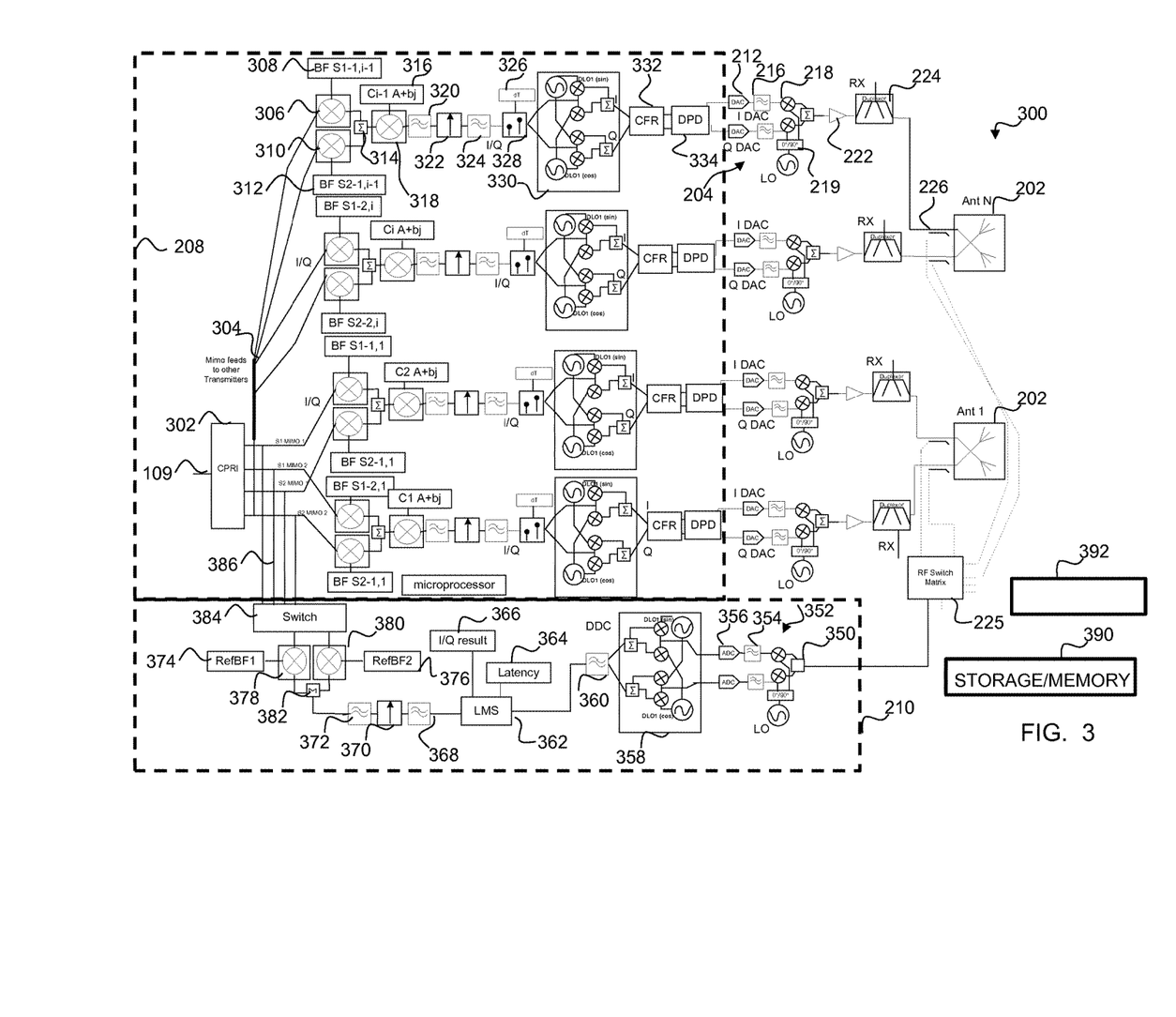
FIG. 3 illustrates a further example of an active antenna array system (AAS) architecture.

In transmit mode in-phase and quadrature (I-Q) sample pairs are input to the digital signal processing module 208, where they are signal processed in accordance with the example embodiment of that described of FIG. 3 herein. The digitally modified 'I' and 'Q' pair signals are then input to digital-to-analog converters (DACs) 212 and thereafter the analogue signal is filtered in low pass filter 216. The baseband analog signals are then up-converted in up-mixer circuitry 218, 219 and combined prior to amplifying in power amplifier 222. The radio frequency, power amplified signals are then fed to the antenna array 202 via a duplexer 224 and coupler structure 228.

In a receive mode, each receiver circuit is operably coupled, via the coupler structure 228, to a XPOL antenna element that is capable of receiving polarisation diversity signals. The coupler structure 228 provides, via duplexor 224, received signals to respective low-noise amplifiers (LNA) 230 via bandpass filters (not shown). The LNAs 230 provide amplified versions of the received signals to respective in-phase and quadrature and ('I' and 'Q') down-conversion stages 232 arranged to down-convert the respective amplified received signals based to a frequency down-conversion local oscillator signal. Down conversion local oscillator signals are fed in quadrature format from local oscillator generation sub-systems 236, 230. The respective quadrature down-converted amplified received signals are input to respective low-pass filters 238 and thereafter to respective analogue-to-digital converters 214 to transform the quadrature down-converted received signal to a digital form. The resultant digital signals are passed to the digital signal processing module 208 for processing.

It will be appreciated by skilled artisans that the example embodiments herein described may be implemented differently in other architectures, for example an antenna array may be configured, such that certain antenna elements are dedicated for transmit processing and other antenna elements are dedicated solely for receive processing. Further, the duplex function may be replaced by a filter in such an arrangement.

A calibration feedback path is also provided using the coupler structure 228. A relatively small proportion of a transmit signal, say −30 dB, or a larger representative portion of a receive signal, say −10 dB, is coupled to a coupled port that is fed into calibration feedback path via a radio frequency switch matrix 225. In one example, the radio frequency switch matrix 225 is placed on the feedback path, such that a single detection path, input to the calibration transceiver 210, can be used for the plurality of transceivers. The calibration feedback path is arranged in a feedback receiver to down convert signals in an IQ format to signal processing module 208 where a detection of phase, amplitude and/or latency mismatch of the transmitted signals is determined and corrected for. Parameters of phase mismatch, amplitude mismatch and latency are some examples of calibration parameters for the embodiments described herein.

In one example embodiment, the calibration scheme (for example as described with reference to FIG. 4) may be configured to account for the fact that there is potentially a unique signal presented to each antenna element feed of the antenna array. To this effect every calibration comparison measurement may generate a unique reference that is compared or calibrated against. In one example, a common transmit signal is sent to all antenna elements.

An example of a mechanism to detect and calculate an amount of phase, amplitude and/or latency mismatch of the transmitted signals is described in a co-pending Patent Application GB0902410.0 by the same applicant, the mechanism of which is incorporated herein by reference.

In this example, the AAS 102 further comprises a DC power management module 260 fed by a DC feed 110 that manages the DC supply to the various respective components and circuits within the AAS 102. The operation of the DC power management module 260, and any clock generation function or module (not shown), is not described for the sake of simplicity.

The example AAS 102 also comprises an optional Ethernet connection 242. In one example embodiment, an OBSAI RP3 01 (not shown) or an ORI interface may be used.

In operation, the architecture of FIG. 2 has been configured to provide a means of calibrating and utilising up to an entirety of antenna elements of an AAS 102 to support different beams using the same antenna elements. In one example, the baseband processing circuit(s) 208 (which in one example is implemented in a form of one or more digital signal processors (DSPs) or (field programmable gate array) FPGAs is configured to process the separate MIMO (multiple input, multiple output) streams per sector are received over CPRI interface 109 by processing said MIMO streams with a calibrated and stored beamform weighted value, before up conversion to, and amplification at, radio frequencies.

Thereafter, in use, a communication unit in the architecture of FIG. 2 is configured as comprising: a plurality of antenna element feeds 203, 205 for coupling to a plurality of antenna elements of an antenna array, where each antenna element feed comprises at least one coupler. A plurality of transmitters is operably coupled to the plurality of antenna element feeds. At least one transmitter of the plurality of transmitters comprises: at least one input for receiving a first signal and at least one second signal; beamformer logic arranged to apply independent beamform weights (RefBF1, RefBF2) on the first signal and the at least one second signal of the transmitter respectively, wherein each of the independent beamform weights is allocated on a per sector basis; and a signal combiner arranged to combine the first signal and the second signal to produce a combined signal, such that the combined signal supports a plurality of sectored beams.

In one example, it is envisaged that a single data stream may be used, in contrast to separate MIMO streams. LTE air interfaces support 2×2 MIMO as a minimum. However, some legacy air interface standards do not employ MIMO, for example UMTS™ and GSM™. In some example applications, the example embodiments described herein may be adapted for use on single downlink data streams form the AAS. Such schemes would not be prohibited from using the concepts described herein, such as vertical sectorisation and calibration therefor. In this scenario, the signal processing would only contain data on one of the DL data streams.

In one example, the array calibration correction may be performed on beam(s) on both transmit (downlink (DL)) and receive (uplink (UL)) signals, in the I-Q digital baseband domain. In this manner, a mechanism is described that effectively provides multi sector support on a single antenna array. Further, in some examples, it may be advantageous to provide multi sector support utilising the same carrier frequency or overlapping occupied spectrum and utilising common antenna elements of the antenna array.

In addition, in some examples, it may be advantageous to provide multi sector support utilising less than a full complement of possible antenna elements of the antenna array. In this manner, one or more antenna elements would not be selected as a means of changing the beam shape.

In other examples, it is envisaged that the respective beams may be used to support multiple air interface technologies, such as various generation of cellular communications, for example global system for mobile communications (GSM™), EDGE, Universal Mobile Telecommunication System (UMTS™) cellular communication systems, $3^{rd}$ generation partnership project (3GPP) system, and evolutions to this standard such as long term evolved (LTE) systems, HSPA+, etc. Example embodiments described herein are with reference to LTE based solutions. As will be appreciated by skilled artisans the teachings are applicable across a wide range of alternative air interface standards, and are, thus, not deemed to be limited to LTE architectures.

Referring now to FIG. 3, a more detailed example block diagram of the transmit downlink baseband processing circuits of 208 and of calibration transceiver 210 of FIG. 2 is illustrated. FIG. 3, illustrates, for clarity purposes only, four transmit blocks, one for each polarisation feed of an antenna element of an AAS 102. Although FIG. 3 illustrates transmit signal processing embodiments only, it is envisaged that comparable receive path and receive signal processing example embodiments will be supported. For example, a mechanism describing how an approach employing duplicity of beams can be synthesised for uplink (UL) receive path signals is described in a co-pending Patent Application GB0902410.0 by the same applicant, the mechanism of which is incorporated herein by reference.

In one example, the UL beams may be synthesised to substantially match one or more beam characteristics or parameters, in terms of, for example, beam pointing direction and/or shape of those of vertical sectorised beams that are used in the downlink (DL), as described in detail herein.

In one example, the downlink (DL) (transmit) data for at least two sectors is supplied by the baseband processing unit 108 of the AAS over the CPRI interface 109. Where a '2×2' MIMO is considered per sector, two logical channel data streams of IQ data samples per sector are transported from the baseband unit to the AAS 102 over the CPRI interface 109. The CPRI interface 109 is coupled to CPRI decode logic 302 that decodes the signal transported from the baseband unit 108 into at least four logic channels of IQ data. Each logical channel IQ data stream would correspond to one of the two MIMO signals per sector. The four logical channel output 304 from the CPRI decode logic 302 comprises: Sector 1 MIMO 1, Sector 1 MIMO2, Sector 2 MIMO 1 and Sector 2 MIMO 2. In this embodiment there are two MIMO logical channel data feed signals to each transmitter. Each transmitter feeds one polarisation feed of the antenna element(s). In this example, two sectors are supported concurrently; by this, it means the transmitter is outputting two sectors at the same time each processing in the DL, two MIMO logical channel streams per sector.

Although this example is described with reference to a '2×2' MIMO case, it is envisaged in other examples (not described that the concept herein described may be applied to any MIMO configuration, such as for example a '4×4' MIMO. Where beams are placed to generate cell sectors, it is usual to have an uplink receive beam and a downlink transmit beam cover the same geographic region. For this reason the beams will be substantially the same for uplink and downlink. Thus, the beam weights would be substantially the same for receive and transmit. In examples, there may be slight differences in the beam if the weights are optimised to, say, the difference in frequency between transmit and receive.

In one example, substantially common beam form weights may be used with MIMO beams or for receive and transmit beams. Where beams are placed to generate cell sectors, it is usual to create an uplink receive beam and a downlink transmit beam that cover the same geographic region. For this reason the beams will be substantially the same for uplink and downlink. Thus, the beam weights would be substantially the same for both receive and transmit functionality. However, in some examples, there may be slight differences in the beam if the weights are optimised to say, address any difference in frequency between transmit and receive.

In the example embodiment, each sector is supported by two logical channel MIMO streams; a first single MIMO logical channel data stream, which is up-converted and transmitted on the −45° slant polarisation, with the other second MIMO logical channel data stream of the sector being transmitted on the +45° slant polarisation. For example, as illustrated, each of the MIMO logical channels with the suffix '1' is transmitted on the +45° slant polarisation and the signals with suffix '2' are transmitted on the −45° slant polarisation. Although FIG. 3 has been illustrated with a 2-sector implementation, it is envisaged that in other examples, that more data streams may be processed in order to generate more than two sectors in similar fashion. Notable from FIG. 3 is that the logical channel MIMO stream to be transmitted, say on the −45° slant polarisation, is transported to the transmitter path supporting such polarisation through interface bus 304.

Let us consider one of the transmitters to describe the example concepts herein employed. Here, both logical channels receive a MIMO stream from a MIMO feed, after passing through the CPRI detect logic 302. Notably, in accordance with example embodiments, respective beamform weights 308, 312 are applied (via complex multiplication stages 306, 310) to the respective logical channels on the transmitter. In one example, the complex multiplication stages 306, 310 adjust the amplitude and phase of the signal passing therethrough. In this context, a complex multiplier is one that uses a complex number in Cartesian format in order to multiply another signal represented in Cartesian format (namely the IQ signal) on the logical channel. The outputs from the two complex multiplication stages 306, 310 are then summed in summing logic 314 in an IQ format. The output of the summation logic is further scaled in complex multiplier 318 using calibration correction coefficient 316. This calibration correction coefficient 316, as input to complex multiplication stage 318, is the correction factor for maintaining correct amplitude and phase of the respective signals at the antenna element feed point 203.

The inventors have determined that up-converting each of the logical channels and adding post up conversion is often suboptimal, in that the phase of the Digital Local Oscillator (DLO) between carriers needs to be in synchronised across the antenna array. This is difficult to achieve and at the limit of current technology. Furthermore, the calibration correction process would need to be duplicated on a per sector basis and this is sub optimal in terms of logic resources.

The beamform weights 308, 312 used will depend on many factors, for example one or more of: the beam shape required, pointing direction, array size, polynomial weighting used for side lobe and beam width optimisation, carrier frequency, the elements' position in the array and distance between other elements on the array. Such factors are discussed in depth on the many treatises on the subject and will not be repeated here to avoid obfuscation of the example concepts described.

Each of the complex multipliers (306, 310, 318) for the purposes of clarity are described as separate multipliers. However, skilled artisans will appreciate that in other example implementations the multipliers may be resource shared to minimise the actual implementation overhead. In this manner, beamform weights and calibration correction factors may be implemented by the same complex multiplier (306, 310, 318). Likewise, in other examples, the calibration correction coefficients may be applied by scaling the beamformer multipliers with the beamformer weights in order to limit the number of multiplier resources required for implementation.

The beam weighted and amplitude and phase corrected logical channel signals are processed through filter and interpolation stage. Thus, the output from the further complex multiplication stage 318 is input through a first low pass filter 320, an interpolation function 322 and a second low pass filter 324. The purpose of the filters 320, 324 is to spectrally filter the signal to conform with spectral mask requirements of the transmitter and limit aliasing as part of the interpolation. The interpolation function 322 is used to transform the sample rate to that required by subsequent signal processing functions, such as digital up-convertor (DUC) 330, digital pre-distorter (DPD) 334 and analog to digital converter (ADC).

The filtered and interpolated signal output from second low pass filter 324 is then processed by a latency adjustment block 328 using correction adjustment 326, this latency adjustment block 328 could be for example an integer sample delay line circuit or a Lagrange sample interpolator. In one example, a combination of both schemes could be applied in implementing the latency adjustment function. A Lagrange sample interpolator is a means of achieving non-integer clock delays of adjustment on the signal processing path. The latency adjustment block (e.g. Lagrange sample interpolator) 328, interpolation function 322 and low pass filter 324 process signals in the Cartesian digital domain. I and Q paths would be processed independently using the processing defined.

The output of latency adjustment block 328 is input to a digital up conversion (DUC) stage 330. The purpose of the DUC 330 is to convert the digital signals at the input to a complex intermediate frequency (IF) output. For example an input baseband signal centred at 0 Hz, may be up-converted to be centred at, for example, −50 MHz. Since the signal is Cartesian IQ format, the carrier can be centred positive or negative frequency about 0 Hz. The Digital Local Oscillator (DLO) frequency sets the IF up-conversion frequency and this can be configured in the system, to support multiple carrier frequency transmission from the same transmitter chain as is known in the art. Although FIG. 3 illustrates a single up-conversion stage, it is envisaged in other examples that multiple DUC stages may be employed in parallel per transmitter chain in order to support concurrently different carrier frequencies. The output of multiple DUC stages would be added to form a composite IQ signal supporting multiple carrier frequencies.

The signals output of the DUC stage 330 is then processed by a Crest Factor Reduction (CFR) signal processing block 332. The purpose of the CFR signal processing block 332 is to reduce a peak-to-average level of the signal being processed by subsequent signal processing chains. For example, LTE and WCDMA filtered signals would generally have a peak-to-average ratio of approximately 14 dB. Power amplifiers (PAs) operating with a back off of 14 dB run inefficiently. Hence, the CFR signal processing block 332 minimises the peak to average ratio often to something in the order of 7 dB, without substantially degrading a signal's figure of merit, such as its error vector magnitude (EVM) or spectral mask. In this manner, the PA may be allowed to run closer to its optimum efficiency point. Since the signal potentially going to each of the antenna element feeds will not be identical, by virtue of different beam weights applied per element, a common CFR block cannot be employed for all signals of a particular polarisation. As such an independent CFR signal processing block 332 (and consequently DPD 334) is applied per signal processing chain basis, and/or on a per radio frequency path basis.

The output of the CFR signal processing block 332 is input to a DPD function 334, which applies correction to the signal(s) based on the distortion measured for the PA used in the processing chain. The DPD function 334 corrects for power amplification distortions such as AM-AM, AM-PM and memory effects of the PA. A feedback point is required to sense the PA distortion, which is not shown in FIG. 3 for the purpose of clarity. The output of the DPD function 334 is routed to a pair of IQ DACs (digital to analogue convertor) 212, filtered 216 and up-converted to the RF frequency using an IQ mixer 218 fed with a local oscillator coupled though a quadrature generation signal processing function 219. The up-converted signal is amplified at RF frequencies by PA 222 prior to routing via duplexer 224, coupler structure 226 and antenna array 202 as described with respect to FIG. 2. In some examples, the output of PA 222 may optionally be coupled off (not shown) for DPD purposes. The duplexer 224 can be connected to a receiver not shown. The duplexer output is passed to a feedback coupler 226 connected to the antenna feed of an antenna element of the antenna array 202.

In some examples, the duplexer 224 may be substituted by a filter if the antenna element in question is not used for receive processing.

For the sake of clarity, and not to obfuscate FIG. 3, FIG. 3 is illustrated showing just two antenna elements of an array. It will be appreciated that, for most practical purposes, the array size will be larger than this, and typically eight to ten antenna may be used.

Also, for the sake of clarity and not to obfuscate FIG. 3, it is envisaged that in other examples, signals of multiple polarisations may be applied, for example where all four streams may be applied to each antenna element.

It will be appreciated by skilled artisans that because one sector may be significantly tilted down more than another, in a vertical plane, it will cover a smaller geographical area that is closer to the AAS installation location. Therefore for a given carrier to interference plus noise ratio (CINR) performance in this nearer geographical location it may be desirable to have a much lower power for the MIMO feeds on this sector. In one example, this may be set by adjusting the MIMO feed signal level at the baseband processing unit 108 and/or may be achieved via an adjustment to the beamformer multiplier values 308, 312.

In one example, the placement of sectors supported by the AAS may be derived from information derived from uplink (UL) signal processing to locate user group density. In this example the UL signal processing may be carried out to identify which angle of arrival UL user power is concentrated. An UL received power measurement at a series of pointing angles of the beams would allow a profile to be generated of 'user concentration' pointing angles. From this it is possible to determine optimum tilt for the sector wide beams. Patent Application GB0911694.8 from the same patent applicant describes an apparatus to determine user profiling of the geographic coverage area of the AAS, where such teaching is incorporated herein by reference.

Now referring to the calibration transceiver 210 of the signal processing chain as outlined in FIG. 3. The signals as presented to the antenna element feed are coupled off, one of the plurality of coupled ports being connected to RF switch matrix 225. One purpose of the RF switch matrix 225 is to select at least one of a plurality of coupled signals on the feed points to the elements of the antenna array. In this example, calibration transceiver 210 comprises splitter 350 to support quadrature down-converting mixers 352 and low pass filtering 354. The resultant signal then has a signal amplitude and frequency range than is capable of being processed by the subsequent ADCs 356. Known techniques for DC offset removal, following the ADC stage, are also employed and are not explained in any greater extent than that considered necessary, in order not to obfuscate or distract from the teachings of the present invention. The ADCs' digital IQ output signal(s) are then processed in a digital down conversion (DDC) function 358 in order to output a signal that is substantially the same as the signal(s) up-converted that are coupled back. These signal(s), which are in Cartesian format, are input to a low pass filter 360, the signal(s) output of which is input to a Least Mean Squares (LMS) adaptive filter 362. The function of the LMS adaptive filter 362 is to compare the signal(s) output of the low pass filter 360 with that of a reference signal(s), the output of filter 368 and determine the amplitude, phase 366 and time (latency) 364 differences between two signals. The signals being compared are the output of the low pass filter generating a reference 368 with that being fed back from low pass filter 360. The LMS adaptive filter 362 will output, once triggered to do so by a software routine, a comparison result estimating the difference of two signals after a comparison measurement time period. In other examples, alternative adaptive filter topologies may also be employed such as MMSE (minimum means squares error) adaptive filter. The LMS or other adaptive filter type, such as MMSE, constitute examples of measurement logic for measuring or comparing the difference between the feedback signal and that of the reference signal.

The calibration transceiver performs, via components 368-384, the reference signal generation function for the LMS adaptive filter 362 for the transmit path calibration. For example, the reference signal for the LMS adaptive filter 362 is generated by means of selecting, at switch 384, the logical channel's that are output on a particular transmit chain that is under calibration comparison measurement to complex multiplier beamformers 378, 380. These logical IQ channels are beamform weighted per the complex values configured through registers 374, 376. These beamform weight registers' 374, 376 values are substantially equal as per that used in the particular transmit chain that is under calibration comparison measurement, as selected through the feedback path through RF switch 225.

It will be appreciated that the beamweights, as configured in registers 374, 376, are equal as those programmed in for example registers 308, 312. However, in some example embodiments, it is envisaged that some implementations may alter the exact values used in each configuration of the registers. For example, if the bit widths of fixed point logic needed on the reference generation path was different to the bit widths of fixed point logic needed on the transmit path, the beamweight may constitute a different numerical value, and would accordingly exist on these registers. It may be also be possible to use, for example, floating point arithmetic on one path and have fixed point arithmetic on the other. In this example, the numerical representation of the same value may be altered. If formats are changed then, as known in the art, numerical rounding errors on the configured values would manifest so the exact values would be marginally altered. Thus, for the claims contained herein a 'substantially equal' beam weight is used on both transmitter under calibration comparison measurement and for reference generation.

The output signals from beamformers 378, 380 are then processed by filters 368, 372 and interpolators 370 as per the transmit chain. This then forms the reference to the LMS adaptive filter 362. In one example, the switch 384 may be replaced by a complex multiplier or scaler module for all four possible logical channels added together to form a reference, the unused logical channels of which are programmed to zero gain effectively switching off this logical path signal from forming part of the reference. Thus, in this manner, the switch 384, complex multiplier or scaler module may be employed for the selection of the reference signal for calibration.

In the example cited in FIG. 3, just two logical channels are capable of being processed by the beamformer 306, 310 or 378, 380; however it will be appreciated that the teachings contained herein do not limit the implementation to just two paths.

Furthermore, in another example (and not shown to avoid obfuscating FIG. 3), it may be desirable to have an instantiation of the CFR signal processing block 332 in order to form part of the reference signal generation, in series with low-pass filter 368, so that signals on this processing chain undergo the same manifestations as that of the transmit path under comparison measurement. In this manner, it may be possible to improve the calibration measurement accuracy.

In one example embodiment, the calibration transceiver 210 is further arranged to process the fed back signals to determine whether any phase, amplitude and/or latency mismatch exists and whether scaling of each individual transmit signal is therefore also required, and if so to effect such a further complex scalar and/or latency adjustment. Thus, at least one calibration correction coefficient from a plurality of calibration parameter measurements may be determined. The at least one calibration correction coefficient may then be applied to one or more subsequent signal(s) that is/are input to a plurality of transmitters of the antenna array, in order to substantially equalise a transfer function of transmit paths to antenna element feeds for the one or more subsequent signal(s).

In this manner, in use, a method for generating a plurality of sectored beams in an antenna array, which comprises a plurality of antenna element feeds for coupling a plurality of respective transmitters to a plurality of antenna elements via respective coupler ports, may comprise: applying a first signal and at least one second signal to a first transmitter of the plurality of transmitters; applying independent beamform weights on the first signal and the at least one second signal of the transmitter, wherein each of the independent beamform weights is allocated on a per sector basis; and combining the first signal and the at least one second signal to produce a combined signal, such that the combined signal supports a plurality of sectored beams.

A transfer function, as understood in the art, is a signal transformation performed on the input signal to that of the output, often taking the form of:

$$\text{Output}(t) = \text{TF}(t) * \text{Input}(t);$$

Where: Output(t) is the output signal with respect to time,
TF(t) is the transfer function with respect to time, and
Input(t) is the input signal with respect to time.

In one example embodiment, the calibration transceiver 210 is run intermittently, as changes in path latency phase and amplitude response are slow changing phenomena. In one example, the calibration transceiver 210 may be arranged to also control the routing of RF signals within RF switch matrix 225 through for example a supervisory microprocessor 392.

Figure 4:
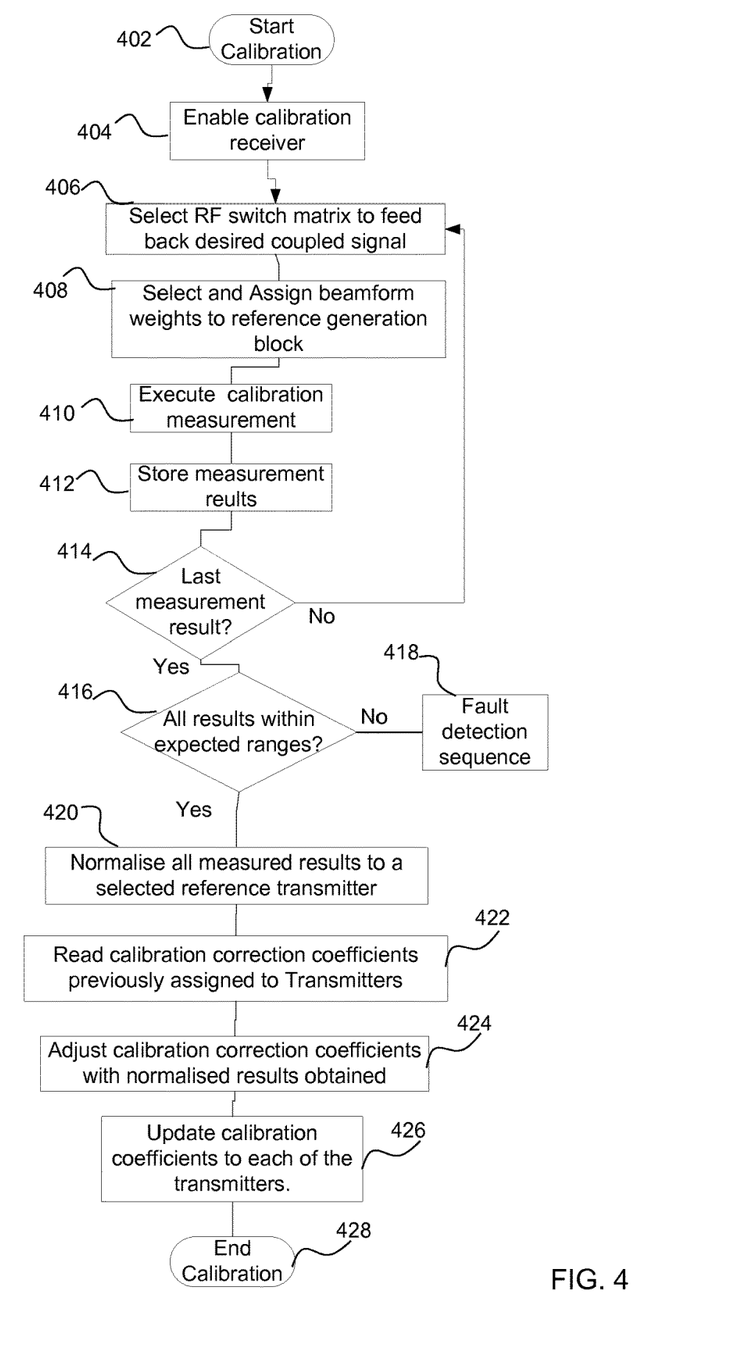
FIG. 4 illustrates an example flowchart of a process of calibrating an active antenna array system (AAS) architecture.

Referring to FIG. 4, an example flowchart illustrates a method of array calibration in an active antenna system, for example located within an AAS, in accordance with example aspects of the invention. Initially, at 402, a calibration mode is initiated, for example by running of a calibration algorithm. In one example, the initiation of the calibration algorithm may be triggered to start by means of instruction from, say, a remote supervisor module controlled over the baseband communication interface (e.g. CPRI) or, say, the initiation of the calibration algorithm may be triggered and scheduled to start by an on-board software program within the AAS. In one example, the calibration algorithm scheduling may be configured to happen at scheduled times or may be triggered as a result of a detection of a changed operating condition, for example due to an environmental change such as where the active antenna module exceeds a temperature threshold or when a new AAS is installed or when an AAS requires reconfiguration. Alternatively, in other examples, the algorithm may be initiated/triggered to start by a network element, such as the network Operations & Management Control (OMC) entity or in response to network planning or by self-optimisation routines at an antenna array.

At 404, at least one calibration receiver is enabled. The algorithm then configures the calibration feedback path, which in one example encompasses turning on the respective feedback path circuits and setting one or more parameters that affect a characteristic of a feedback signal, such as: setting the local oscillator (LO) frequency(ies) and/or Digital Local Oscillator (DLO) frequency(ies), setting filter bandwidths, setting a gain response of the feedback receiver, etc. In one example, and advantageously, these settings may be common for all feedback comparison measurements, thereby negating any impact on the calibration result.

At 406, an RF switched coupled matrix is then selected to route a desired signal on one of the coupler ports signals to the feedback receiver. The logical channels associated with this coupled feedback signal are also selected. These logical channels, selected using switch 384, have the beamform weights applied RefBF1 374, RefBF2 376 that correspond to that used in the actual element feedback to be measured. Thus, at 408, beamform weights are selected and assigned to a reference generation block. In some examples, the beamform weights may have been previously determined, but shall be substantially the same as that used in the selected feedback path.

At 410, the calibration comparison measurement(s) is executed, for example using a least means squares (LMS) function. In one example, the LMS function may be given time to converge to a final value before results are obtained. In one example, the time to wait for convergence may depend on one or more characteristics of an adaptive filter, the resultant error allowable and/or any LMS gearing strategy employed.

In one example, at 412, the executed calibration comparison measurement result(s) are read from the LMS and stored as attributed to this coupled feedback path. In some examples, the executed calibration comparison measurement(s) may be stored in an integrated storage module.

At 414, a determination is made as to whether the calibrated path is the final coupled feedback path of the array. If, at 414, the algorithm determines that the final comparison measurement result has not been executed and stored, the flowchart transitions to 406, a new feedback path is selected and the process repeats. Otherwise, the algorithm moves to 416, and determines whether the stored comparison measurement result(s) are within expected ranges. In some examples, the expected ranges may have been previously determined. At this point, in some examples, any outliers in terms of amplitude performance may be identified. These could be, for example, as a result of a component failure in the transmitter chain. Normally, these results may indicate an alarm condition or they may trigger corrective action in the form of resetting parameters to that transmit chain. Failing this, there would be a modification of the beamforming parameters for the rest of the array to compensate for the failed path.

If the algorithm determines, at 416, that the result(s) are not within expected ranges, the algorithm transitions to running a fault detection sequence at 418. Otherwise, if the algorithm determines, at 416, that the result is the final comparison measurement of the calibration sequence and the results fall within expected tolerance ranges, then a reference transmitter is selected to which all reference amplitude and phases are references at 420. One purpose of the calibration algorithm is to ensure that the transfer function of all transmitters be made substantially the same, so that the beamform signal adjustments are preserved at the antenna element feeds. For this reason one transmitter is selected as a reference and all other transmitters have an adjustment that is determined to match the transfer function of this reference transmitter. This process may involve dividing one LMS IQ result of a reference transmitter from all other results. A reference transmitter may be selected on the basis that it provides, say, the lowest gain within an expected range and all other transmitters can then be adjusted to this lowest gain. The basis of selecting the reference transmitter is not important, so long as an adjustment can be made to the remainder of the transmitters, thereby ensuring a substantially equal transfer function to that of the selected reference transmitter. A substantially equal transfer function, for the purposes of the embodiments described herein, may be within the tolerances of a calibration scheme, This tolerance could be, in one example, better than 1 dB variation on gain equalisation and better than 20° variation on phase equalisation.

In one example, in order to normalise the latency, the longest latency result of the measured results may be the designated reference and all other paths may be measured with respect to this one.

At 422, the algorithm reads calibration correction coefficients that were previously assigned to the transmitters, namely the Ci A+Bj results, as used in calibration correction coefficient registers 316, 318 and associated Δt results, as used in latency adjustment registers 326 from FIG. 3. In 424, the normalised adjustments from 420 are then used to modify the previously used normalised results as compiled in 422 to generate a new set of correction coefficients. In one example, the modification may be an addition or subtraction process, or multiplication or division process depending on the LMS adjustment path used in the example implementation and if the signal gain adjustment calculation is in decibel format or linear format. Latency adjustment is always modified in an addition or subtraction process. This results in new updated coefficients for the correction of each of the transmit paths. At 426, updated calibration correction coefficients are sent to each of the transmitters where the updated Ci A+Bj and Δt are written to register memory locations, for example 316, 326 respectively used to apply the correction scaling factors to each of the signals processed in each of the transmitter paths of the antenna array. The calibration algorithm is then completed at 428.

Thereafter, the calibrated coefficients may be used. For example, a method for generating a plurality of sectored beams in an antenna array that comprises a plurality of antenna element feeds for coupling a plurality of respective transmitters to a plurality of antenna elements via respective coupler ports may follow the following method, at a communication unit and in conjunction with the aforementioned description of FIG. 2 and FIG. 3. The method may comprise applying a first signal and at least one second signal to a first transmitter of the plurality of transmitters; applying independent beamform weights on the first signal and the at least one second signal of the transmitter, wherein each of the independent beamform weights is allocated on a per sector basis; and combining the first signal and the at least one second signal to produce a combined signal, such that the combined signal supports a plurality of sectored beams.

Figure 5:
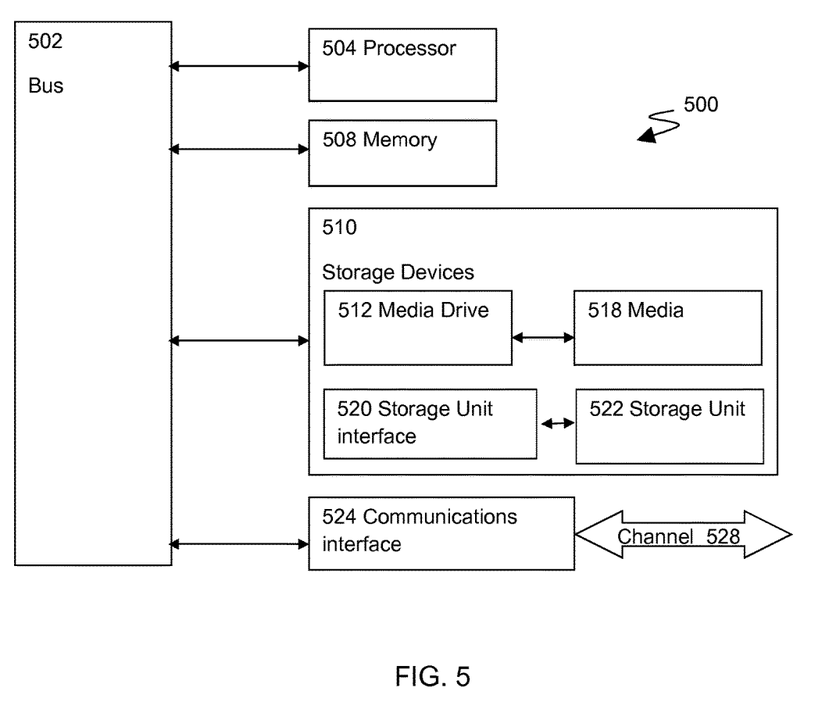
FIG. 5 illustrates a typical computing system that may be employed to implement signal processing functionality in embodiments of the invention.

Referring now to FIG. 5, there is illustrated a typical computing system 500 that may be employed to implement signal processing functionality in embodiments of the invention. Computing systems of this type may be used in network elements/wireless communication units. In some examples, the computer program and storage media may be located in the cloud or somewhere in the network of the operator environment, for example at an Operations and Management Centre (OMC). Those skilled in the relevant art will also recognize how to implement the invention using other computer systems or architectures. Computing system 500 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 500 can include one or more processors, such as a processor 504. Processor 504 can be implemented using a general or special-purpose processing engine such as, for example, a microprocessor, microcontroller or other control logic. In this example, processor 504 is connected to a bus 502 or other communications medium.

Computing system 500 can also include a main memory 508, such as random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory (ROM) or other static storage device coupled to bus 502 for storing static information and instructions for processor 504.

The computing system 500 may also include information storage system 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 518 may include, for example, a hard disk, floppy disk, magnetic tape, optical disk, CD or DVD, or other fixed or removable medium that is read by and written to by media drive 512. As these examples illustrate, the storage media 518 may include a computer-readable storage medium having particular computer software or data stored therein.

In alternative embodiments, information storage system 510 may include other similar components for allowing computer programs or other instructions or data to be loaded into computing system 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a universal serial bus (USB) port), a PCMCIA slot and card, etc. Software and data transferred via communications interface 524 are in the form of signals that can be electronic, electromagnetic, and optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 508, storage device 518, or storage unit 522. These and other forms of computer-readable media may store one or more instructions for use by processor 504, to cause the processor to perform specified operations. Such instructions, generally referred to as 'computer program code' (which may be grouped in the form of computer programs or other groupings), when executed, enable the computing system 500 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 500 using, for example, removable storage drive 522, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the beamformer logic or measurement logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

In one example, and as hereinbefore described, an integrated circuit for at least one transceiver of a communication unit comprises: at least one input for receiving a first signal and at least one second signal; beamformer logic arranged to apply independent beamform weights (RefBF1, RefBF2) on the first signal and the at least one second signal of the transmitter respectively, wherein each of the independent beamform weights is allocated on a per sector basis; and a signal combiner arranged to combine the first signal and the second signal to produce a combined signal, such that the combined signal supports a plurality of sectored beams.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A communication unit for generating a plurality of sectored beams, the communication unit comprising:
a plurality of antenna element feeds arranged to couple to a plurality of antenna elements of an antenna array, wherein an individual antenna element feed of the plurality of antenna element feeds is configured to provide a transmit signal associated with two sectors;
a plurality of transmitters operably coupled to the plurality of antenna element feeds; wherein a transmitter of the plurality of transmitters is configured to receive a first signal associated with a first sector and a second signal associated with a second sector, the two sectors comprising the first sector and the second sector, and the transmitter comprises:
beamformer logic arranged to apply independent beamform weights on the first signal and the second signal of the transmitter to generate a weighted first signal and a weighted second signal, respectively, wherein each of the independent beamform weights is allocated on a per sector basis; and
a signal combiner arranged to combine the weighted first signal and the weighted second signal to produce a combined signal such that the combined signal supports sectored beams for the two sectors, wherein an output of the signal combiner is operably coupled to the individual antenna element feed, and
wherein the beamformer logic is configured to apply a calibration correction coefficient so as to calibrate an amplitude and a phase of the combined signal.

2. The communication unit of claim 1 further comprising a signal processor operably coupled to beamformer logic and arranged to concurrently process a transmission of sectored beams for the two sectors applied to antenna element feeds of the plurality of antenna elements.

3. The communication unit of claim 1 wherein the beamformer logic is arranged to apply the independent beamform weights such that beams associated with the two sectors are transmitted on the same carrier frequency or in an overlapping occupied spectrum.

4. The communication unit of claim 1 wherein the antenna array is configured to support the two sectors on a single carrier frequency using at least the individual antenna element feed.

5. The communication unit of claim 1 further comprising a frequency converter operably coupled to the signal combiner and arranged to frequency-convert the combined signal and route the frequency-converted combined signal to the individual antenna element feed to support the sectored beams for the two sectors.

6. The communication unit of claim 1 further comprising a Crest Factor Reduction signal processing block arranged to apply crest factor reduction to the combined signal.

7. The communication unit of claim 1 wherein the calibration correction coefficient is normalised for the transmitter against a reference transmitter.

8. The communication unit of claim 1 wherein the transmitter comprises a complex multiplier operatively coupled to an output of the signal combiner, the complex multiplier configured to scale the combined signal at baseband using the calibration correction coefficient.

9. The communication unit of claim 1 wherein one or more complex multipliers are arranged to apply the independent beamform weights and the calibration correction coefficient.

10. The communication unit of claim 1 wherein the beamformer logic is arranged to apply the independent beamform weights on the first signal and the second signal to provide beam sectorisation in at least one of a vertical plane or a horizontal plane.

11. The communication unit of claim 10 wherein the beam sectorisation comprises a first sectored beam at a first power and a second sectored beam at a different second power.

12. The communication unit of claim 10 wherein the beam sectorisation comprises a first sectored beam at a first beamwidth and a second sectored beam at a different second beamwidth.

13. The communication unit of claim 1 wherein the beamformer logic is configured to apply the calibration correction coefficient in a digital domain.

14. An integrated circuit for a transmitter configured to support sectored beams, the integrated circuit comprising:
beamformer logic arranged to apply independent beamform weights on a first signal and a second signal to generate a weighted first signal a weighted second signal, respectively, wherein each of the independent beamform weights is allocated on a per sector basis; and
a signal combiner arranged to combine the weighted first signal and the weighted second signal to produce a combined signal such that the combined signal supports a plurality of sectored beams for transmission, wherein the beamformer logic is configured to apply a calibration correction coefficient so as to calibrate an amplitude and a phase of the combined signal.

15. The integrated circuit of claim 14 wherein a complex multiplier is configured to scale the combined signal at baseband using the calibration correction coefficient.

16. The integrated circuit of claim 14 wherein two or more complex multipliers are arranged to apply the independent beamform weights and the calibration correction coefficient.

17. A method for generating sectored beams with an antenna array that comprises a plurality of antenna element feeds for coupling a plurality of respective transmitters to a plurality of antenna elements via respective coupler ports, the method comprising:
applying independent beamform weights on the first signal of a first transmitter of the plurality of transmitters and a second signal of the first transmitter to generate a weighted first signal and a weighted second signal, respectively, wherein each of the independent beamform weights is allocated on a per sector basis;
combining the weighted first signal and the weighted second signal to produce a combined signal associated with sectored beams for two sectors;
applying a calibration correction coefficient to calibrate an amplitude and a phase of the combined signal; and
generating the sectored beams for the two sectors such that an individual antenna element of the plurality of antenna elements transmits a transmit signal associated with the two sectors, wherein the transmit signal is generated based on said applying the calibration correction coefficient to calibrate the amplitude and the phase of the combined signal.

18. The method of claim 17 further comprising:
normalising the calibration correction coefficient relative to at least one other transmitter of the plurality of transmitters; and
effecting an adjustment of at least one parameter on the first transmitter in response to said normalising.

19. The method of claim 18 wherein normalising the calibration correction coefficient relative to the first transmitter comprises normalising the at least one calibration correction coefficient relative to a transmitter of the plurality of transmitters that is determined as having the longest latency.

20. The method of claim 17 wherein applying the calibration correction coefficient is performed in a digital domain.

* * * * *